No. 851,453. PATENTED APR. 23, 1907.
C. STONER.
WASHING MACHINE.
APPLICATION FILED APR. 6, 1906.
2 SHEETS—SHEET 1.
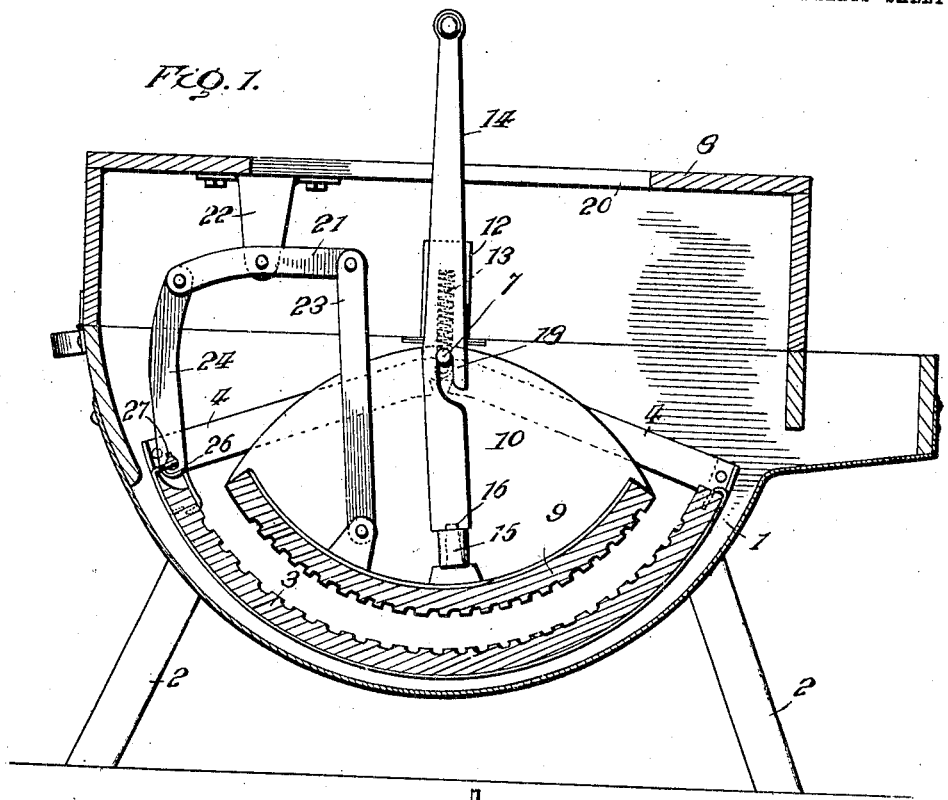
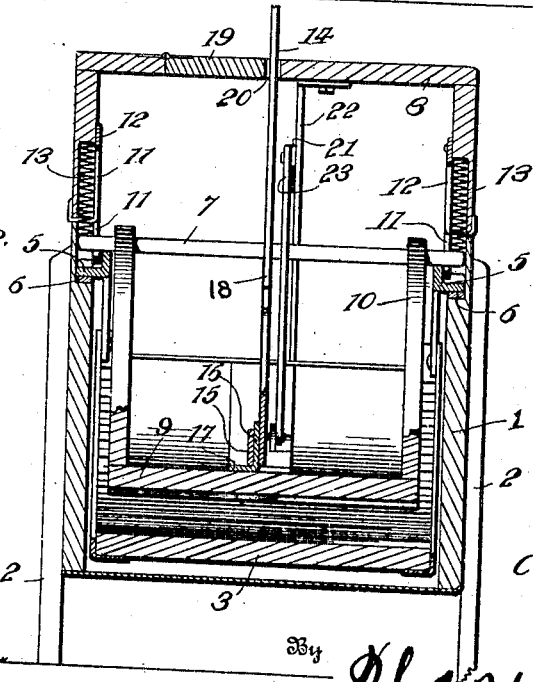
Inventor
Chas. Stoner,
Witnesses
By
Attorneys
THE NORRIS PETERS CO., WASHINGTON, D. C.

No. 851,453. PATENTED APR. 23, 1907.
C. STONER.
WASHING MACHINE.
APPLICATION FILED APR. 6, 1906.
2 SHEETS—SHEET 2.
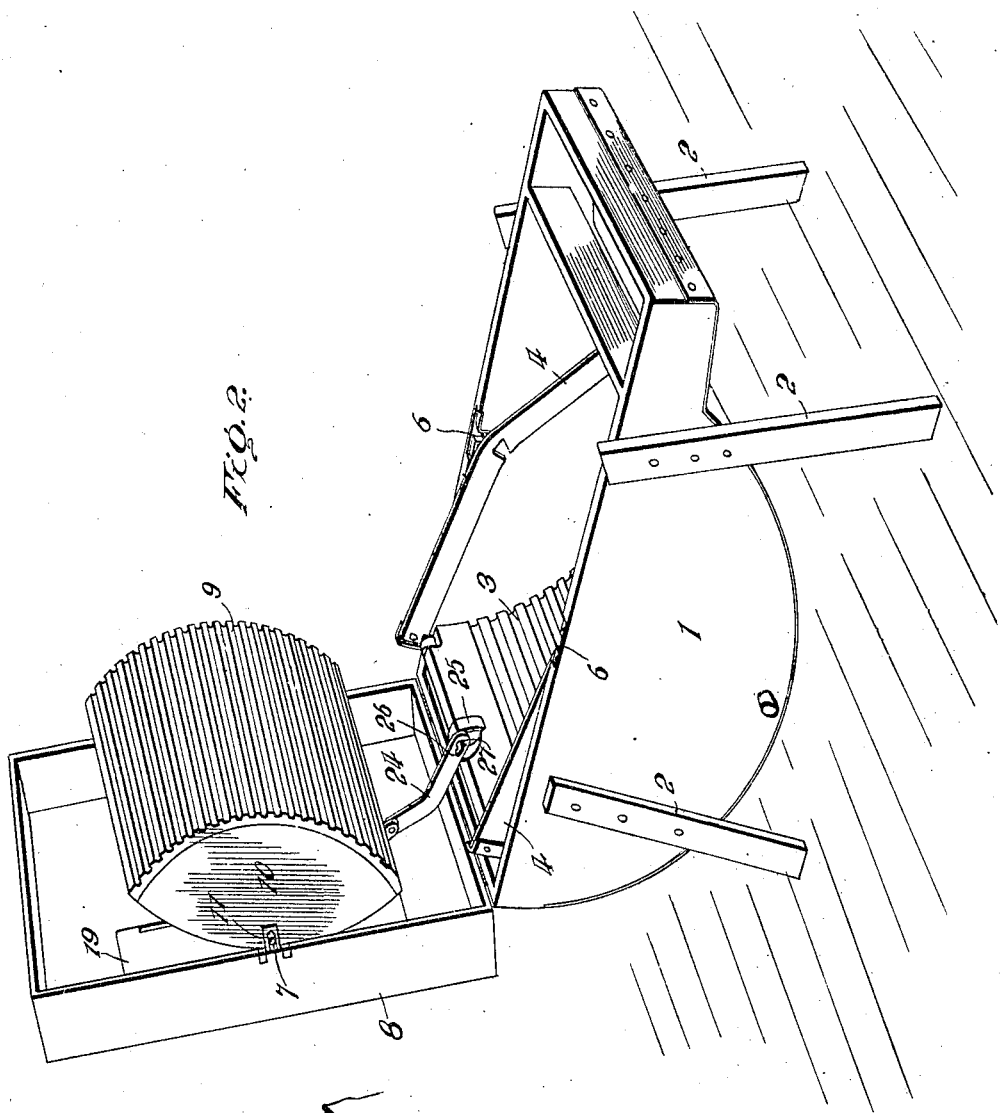
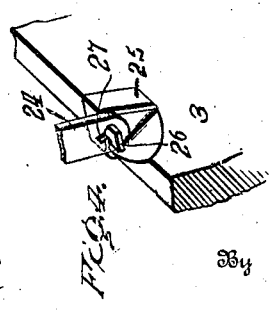

UNITED STATES PATENT OFFICE.

CHARLES STONER, OF SYRACUSE, KANSAS.

WASHING-MACHINE.

No. 851,453.  Specification of Letters Patent.  Patented April 23, 1907.

Application filed April 6, 1906. Serial No. 310,362.

*To all whom it may concern:*

Be it known that I, CHARLES STONER, a citizen of the United States, residing at Syracuse, in the county of Hamilton and State of Kansas, have invented certain new and useful Improvements in Washing-Machines, of which the following is a specification.

This invention embodies improvements in washing machines, the essential feature of the invention residing in the peculiar and advantageous arrangement and construction of the rubbers used on the machine, as well as the special operating mechanism employed therefor.

For a full understanding of the invention and the merits thereof and also to acquire a knowledge of the details of construction of the means for effecting the result, reference is to be had to the following description and accompanying drawings, in which:

Figure 1 is a longitudinal sectional view of a washing machine embodying the invention. Fig. 2 is a perspective view showing the cover of the machine thrown open, bringing out more clearly the arrangement of the rubbers when said cover is in this position. Fig. 3 is a transverse vertical sectional view. Fig. 4 is a detail view showing more clearly the connection of one of the links with the lever.

Corresponding and like parts are referred to in the following description and indicated in all the views of the drawings by the same reference characters.

Specifically describing the invention, the numeral 1 designates the washing receptacle, which may be mounted upon the usual supporting legs 2. In the receptacle 1 is located the lower rubber 3, which is of somewhat semi-circular form and which is adapted for oscillatory movement. The rubber 3 is attached at its sides to side frames 4, the upper bars of which are provided centrally with laterally projecting journals 5, mounted in suitable bearings 6 at opposite sides of the receptacle 1. The upper ends of the bearings 6 are open so as to readily receive the ends of a shaft 7 attached to the cover 8 of the receptacle 1, said shaft having the upper rubber 9 of the machine, mounted thereon. The upper rubber 9 is somewhat similar in form to the rubber 3, save that the sides 10 of the first mentioned rubber are solid, the shaft 7 passing through the upper portions of said sides. The shaft 7 is connected with the cover by being mounted in vertical slots 11 of bearing plates 12, which plates are attached in any substantial way to the cover 8 at opposite sides thereof. Springs 13 mounted adjacent to the outer sides of the bearing plates 12, normally bear against the outer extremities of the shaft 7 to yieldingly hold the upper rubber 9 down upon the lower rubber 3. The yielding mounting of the upper rubber is necessary and advantageous in the operation of washing clothes in order to accommodate for the amount of wearing apparel disposed in the machine for manipulation thereby. When the cover 8 is down upon the receptacle 1, in its normal position for use, the ends of the shaft 7 are received in the bearings 6 so that said bearings 6 accommodate the journals of both of the rubbers 3 and 9.

The mechanism for operating the rubbers 3 and 9 comprises a handle 14, having a socket 15 at its lower end to receive an arm 16 projecting upwardly from the upper side of the upper rubber 9. The arm 16 may form an extension of a plate 17 attached to the upper side of rubber 9 to reinforce the same. A hook 18 projects laterally and downwardly from the handle 14 intermediate of its ends and when the socket 15 receives the arm 16, the hook 18 is engaged over the shaft 7 and the handle is held rigidly in position with the upper end thereof projecting upwardly through the top of cover 8. The cover 8 is provided with an auxiliary hinged lid 19 to facilitate access to the operating mechanism without necessitating raising of the cover 8, and said lid 19 has its free outer edge portion cut away, as shown at 20, to permit the handle 14 to project through the top of the cover. The rubbers 3 and 9 are connected for simultaneous movement by means of a lever 21 pivoted between its ends to a bracket 22 attached to the under side of cover 8. One end of lever 21 is connected by a link 23 with the rubber 9, while the other end of the lever 21 is connected by a similar link 24 with the lower rubber 3. The lower rubber 3 is provided at one end with an attaching plate 25 having a laterally projecting key-lug 26, and this lug is adapted to pass through a key-shaped opening 27 formed in the lower end of link 24 to establish a detachable, but an interlocking, connection between the link 24 and the rubber 3. In a certain position of the rubber 9, the link 24 may be readily detached from the rubber 3 in an obvious way.

It will be understood that the handle 14 may be provided at its upper end with a suitable grip to be grasped by the operator in moving said handle back and forth. However, it is contemplated that the handle may be connected with any suitable operating mechanism to be manually actuated or to be power driven in order to effect operation of the machine under actual conditions of service. As the handle 14 is forced in one direction, the rubbers 3 and 9 are moved in reverse directions by reason of the peculiar connections afforded by the parts 21, 23 and 24.

The operation of the machine is very simple and it is constructed to secured the best results in facilitating the washing of the clothes to be cleansed thereby.

Having thus described the invention, what is claimed as new is:

1. In a washing machine, the combination of a receptacle, a lower rubber, journals for said lower rubber projecting laterally therefrom and supported in bearings at opposite sides of the receptacle, a cover for the receptacle, an upper rubber, journals for said upper rubber mounted in bearings at opposite sides of the cover, said journals of the upper rubber being received in the bearings of the lower rubber when the cover of the receptacle is closed, thereby preventing play of the journals of the lower rubber, and means for operating the rubbers.

2. In a washing machine, the combination of a receptacle, a lower rubber movably journaled in the receptacle, bearings at opposite sides of the receptacle for the journals of the lower rubber, a cover for the receptacle, an upper rubber journaled on said cover, bearings for the journals of the upper rubber arranged so that the journals of the upper rubber will be received in the bearings of the lower rubber, means for operating the rubbers, and yielding means coacting with the journals of the upper rubber to hold the same in proper relative position to the lower rubber.

3. In a washing machine, the combination of a receptacle, a lower rubber movably mounted within the receptacle, bearings at opposite sides of the receptacle for the journals of the lower rubber, a cover for the receptacle, an upper rubber journaled in said cover, bearings for the journals of the upper rubber arranged so that the journals of the upper rubber will be received in the bearings of the lower rubber, and means for operating the rubbers.

In testimony whereof I affix my signature in presence of two witnesses.

CHAS. STONER. [L. S.]

Witnesses:
 FORD CRITTENDEN,
 EARL A. STEWART.